United States Patent [19]

Iio et al.

[11] Patent Number: 4,700,271

[45] Date of Patent: Oct. 13, 1987

[54] TERMINAL ASSEMBLY FOR A PANEL BOARD

[75] Inventors: Tukasa Iio; Sumio Egusa, both of Fukuyama City, Japan

[73] Assignee: Mitsubishi Denki Kabushiki Kaisha, Japan

[21] Appl. No.: 801,806

[22] Filed: Nov. 26, 1985

[30] Foreign Application Priority Data

| | | | |
|---|---|---|---|
| Nov. 29, 1984 | [JP] | Japan | 59-181866[U] |
| Dec. 4, 1984 | [JP] | Japan | 59-184454[U] |
| Dec. 4, 1984 | [JP] | Japan | 59-184455[U] |

[51] Int. Cl.⁴ .......... H02B 1/04

[52] U.S. Cl. .......... 361/355; 361/361; 361/373; 361/426; 439/723; 439/798; 439/814

[58] Field of Search .......... 339/22 B, 198 H, 198 N, 339/198 R, 242, 272 UC; 361/341, 355, 361, 373, 425, 426

[56] References Cited

U.S. PATENT DOCUMENTS

| | | | |
|---|---|---|---|
| 2,453,224 | 11/1948 | Hill et al. | 339/242 |
| 2,713,672 | 7/1955 | Allen | 339/272 UC |
| 2,905,923 | 9/1959 | Hammerly | 339/198 N |
| 2,953,771 | 9/1960 | Kussy | 339/272 UC |
| 3,171,708 | 3/1965 | Salomone | 339/198 N |
| 3,335,330 | 8/1967 | Hall | 339/198 N |
| 3,727,171 | 4/1973 | Coles et al. | 339/242 |
| 4,307,365 | 12/1981 | Martincic | 336/92 |

*Primary Examiner*—A. D. Pellinen
*Assistant Examiner*—Gregory D. Thompson
*Attorney, Agent, or Firm*—Leydig, Voit & Mayer

[57] ABSTRACT

An improved terminal assembly for a panel board is disclosed which is simple in construction, easy to assemble and low in manufacturing costs. The panel board terminal assembly includes a bus bar mounted on support members formed of an electrically insulating material and a plurality of terminal frames each in the form of a substantially U-shaped cross section having a pair of opposed side walls and an intermediate wall interconnecting the side walls. The side walls have a pair of aligned openings formed therethrough into which the bus bar is inserted. A plurality of terminal screws are each threaded in the intermediate wall of each terminal frame for clamping an external conductor between the shank of each screw and the bus bar. For ensuring a more reliable connection between the electrical conductor and the bus bar, each of the side walls of each of the terminal frames is provided with a pair of inward projections just above the aperture for precluding the spreading of wires in the electrical conductor out from under the shank of the terminal screw. To prevent ground faults, an insulating plate is disposed between the supports and a base member of the panel board, and preferably the support members have lower seats projecting through apertures in the insulating plate to directly seat on the base member.

13 Claims, 11 Drawing Figures

TERMINAL ASSEMBLY FOR A PANEL BOARD

BACKGROUND OF THE INVENTION

The present invention relates, in general, to an electrical apparatus and, more specifically, to a terminal assembly for a panel board.

FIG. 11 shows, in a perspective view, a conventional terminal assembly for a panel board. In this Figure, reference numeral 1 designates a bus bar which is fixedly mounted by fastening means 1*a* such as rivets on a pair of support members 2 formed of an electrically insulating material. Securely attached by fastening means such as brazing, fastening screws and the like to the bus bar 1 are a main block or terminal 3 having a main terminal screw 4 threaded therein and a branch block or a branch terminal assembly 5 having four in-line branch terminals with four branch terminal screws 6 threaded therein in spaced apart relation to each other. The main block or terminal 3 has an opening 3*a* formed therethrough for receiving a hot line or an external conductor (not shown) leading to a power source (not shown), the hot line being adapted to be inserted into the opening 3*a* and clamped therein by means of the main terminal screw 4 for electrical connection with the main block 3. Similarly, the branch block or branch terminal assembly 5 has four openings 5*a* formed therethrough in spaced parallel relation with each other for receiving four neutral lines or external conductors (not shown) leading to respective electrical loads (not shown). In this connection, it is to be noted that although in the illustration of FIG. 11 the branch terminal assembly 5 is formed of an integral block member, it may, of course, be constructed of a plurality of independent or separate block members disposed in parallel relation with each other, each of the independent block members constituting a single branch terminal.

The conventional panel board terminal assembly as constructed above has the following disadvantages. Namely, the main block 3 and the branch block 5 generally have to be formed by die-casting brass, and hence the manufacturing cost of the entire terminal assembly becomes high. Also, attaching the main and branch blocks 3, 5 to the bus bar 1 by brazing, fastening screws or the like makes the assembling operation cumbersome, inefficient and costly.

SUMMARY OF THE INVENTION

The present invention is intended to obviate the above-mentioned disadvantages of the prior art.

A primary object of the present invention is to provide a novel and improved terminal assembly for a panel board of the kind described above which is simple in construction and easy to assemble, and which can be manufactured at low cost.

A more specific object of the present invention is to ensure more reliable electrical connections and prevent ground faults in a terminal assembly for a panel board which comprises a bus bar mounted on support members formed of an electrically insulating material, a plurality of terminal frames each in the form of a substantially U-shaped cross section having a pair of opposed side walls and an intermediate wall interconnecting the side walls, the side walls having a pair of aligned openings formed therethrough into which is inserted the bus bar, and a plurality of terminal screws corresponding in number to the terminal frames and each threaded in the intermediate wall of each terminal frame for clamping an external conductor between the shank of each screw and the bus bar.

The above and other objects, features and advantages of the present invention will become apparent from the following detailed description of presently preferred embodiments of the invention when taken in conjunction with the accompanying drawings.

DESCRIPTION OF THE PREFERRED EMBODIMENTS

Now, the invention will be described in conjunction with presently preferred embodiments thereof by referring to the accompanying drawings. In the following description, the same or corresponding parts of the panel board terminal assembly shown in FIGS. 1 through 10 of the drawings are identified by the same reference numbers.

Figure 1:
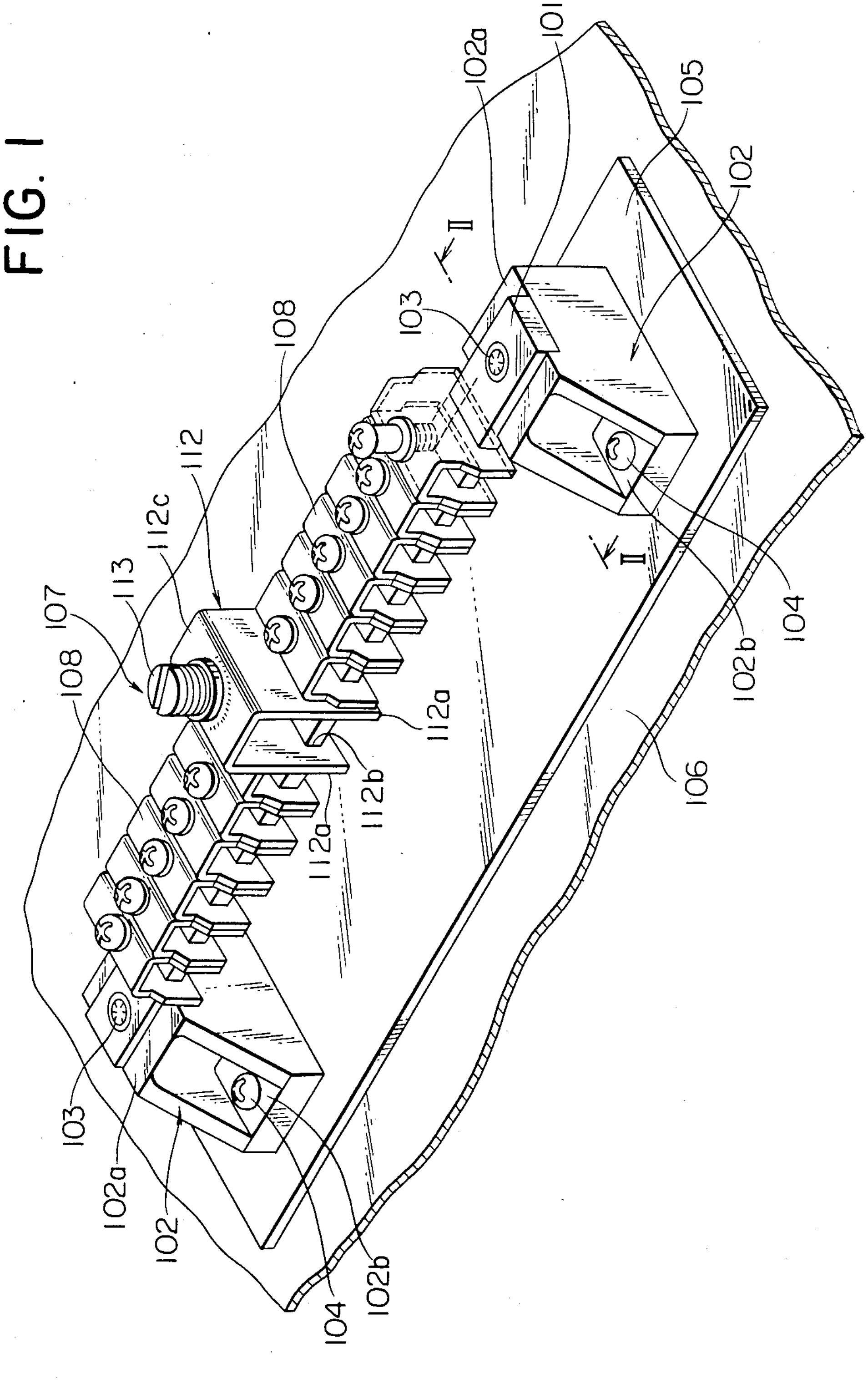
FIG. 1 is a perspective view showing the general construction and arrangement of a terminal assembly for a panel board constructed in accordance with the present invention.
Figure 2:
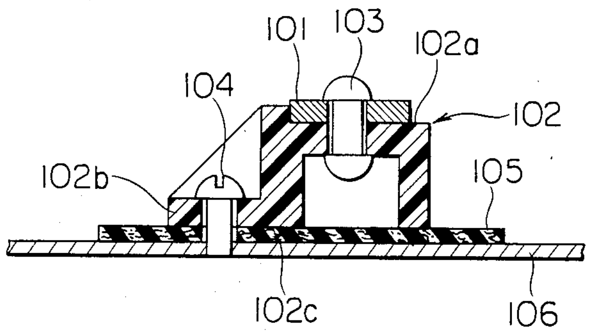
FIG. 2 is a cross sectional view taken along the line II—II of FIG. 1.

In FIG. 1, there is shown the general construction and arrangement of a terminal assembly for an electrical panel board constructed in accordance with the present invention. In this figure, a bus bar 101 formed of an electrically conductive material and having a rectangular cross section is secured at its opposite ends to a pair of support members 102 formed of an electrically insulating material such as synthetic resin at their flat top surfaces 102*a* by virtue of fastening means 103 such as rivets. The support members 102 are fixedly mounted at their lower mounting portion 102*b* on a base member 106 of the panel board by fastening screws 104 with an electrically insulating plate 105 being interposed therebetween for preventing ground faults of a main terminal 107 and a plurality of branch terminals 108, which will be described in detail later.

The insulating plate 105 extends along the bus bar 101 beyond the outer side of each support member 102 so that the branch terminals 108, disposed immediately adjacent the support members 102, are prevented from being grounded. The bus bar 101 is supported on the top surface 102*a* of each support member 102 so that a certain distance between the bus bar 101 and the base member 106 is maintained for electrical insulation.

The main terminal 107 and the branch terminals 108 are mounted on the bus bar 101 in an in-line form with the main terminal 107 being disposed at the longitudinal center of the bus bar 101. As best seen from FIGS. 3 to 5, each of the branch terminals 108 comprise a branch terminal frame 110 which is formed by pressing a steel plate into a channel-like cross section. The branch terminal frame 110 has a pair of opposed side walls 110*a* with a pair of aligned openings 110*b* of rectangular cross section formed therethrough, and an intermediate or top wall 110*c* interconnecting between the opposed side walls 110*a* with a branch terminal screw 111 being threaded into the top wall 110*c*. Similarly, the main terminal 107 comprises a main terminal frame 112 which is formed by pressing a steel plate into a channel-like cross. The main terminal frame 112 has a pair of opposed side walls 112*a* with a pair of aligned openings 112*b* of rectangular cross section formed therethrough, and an intermediate or top wall 112*c* interconnecting between the opposed side walls 112*a* with a main terminal screw 113 being threaded into the top wall 112*c*.

Assembly of the main terminal 107 and the branch terminals 108 is effected very simply by inserting the bus bar 101 into the aligned openings 112*b* in the side walls 112*a* of the main terminal frame 112 and the aligned openings 110*b* in the side walls 110*a* of each branch terminal frame 110 before fastening of the bus bar 101 to the support members 102 by means of the rivets 103.

Figure 3:
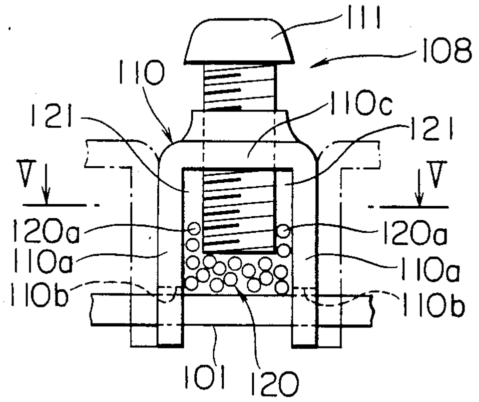
FIG. 3 is a front elevational view, on an enlarged scale, of a branch terminal shown in FIG. 1.
Figure 4:
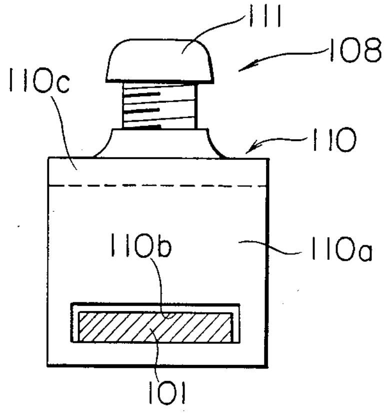
FIG. 4 is a side elevational view, on an enlarged scale, of the branch terminal.
Figure 5:
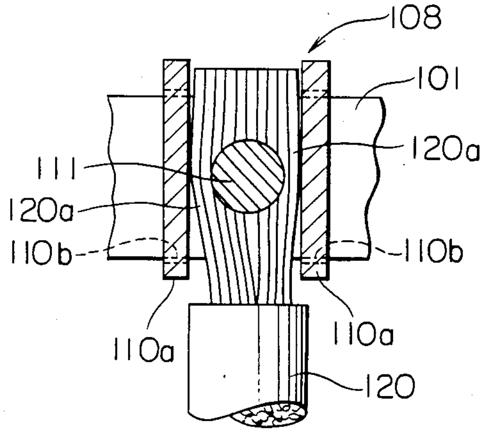
FIG. 5 is a cross sectional view taken along the line V—V of FIG. 3.

With the panel board terminal assembly as constructed in the above-described manner, as clearly viewed in FIGS. 3 and 5, lead wires 120*a* of a neutral line or external conductor 120 leading to an electrical load (not shown) are inserted into a space defined by the inner peripheral surface of each branch terminal frame 110 and the bus bar 101, and the related branch terminal screw 111 is then turned to push and clamp the lead wires 120*a* against the bus bar 101 so that there is formed an electrical connection between the bus bar 101 and the neutral line 120 and at the same time the branch terminal frame 110 is forced to strongly engage at the underside edges of the openings 110*b* in the opposite side walls 110*a* so as to be firmly fixed to the bus bar 101. Also, a hot line (not shown) leading to a power source (not shown) can be electrically connected to the main terminal 107 in the same manner as in the above-mentioned neutral line 120.

It will be appreciated to those skilled in the art that fabrication of the respective main and branch terminal frames 112, 110 by the pressing steel plates serves to reduce not only the cost of material required but also the cost of manufacturing, thus providing a substantial cut in the overall cost.

In the above-described embodiment, however, there are necessarily formed some clearances 121 between the inner surfaces of the opposite side walls 110*a* of the branch terminal frame 110 and the threaded shank of the branch terminal screw 111, as clearly shown in FIG. 3, so that upon clamping of the lead wires 120*a* of the neutral line 120 by turning the branch terminal screw 111, the lead wires 120*a* are made to escape into the clearances 121 thereby to make a poor or unsatisfactory electrical connection between the neutral line 120 and the bus bar 101. Also as a result, the neutral line 120 is liable to be easily disconnected from the branch terminal frame 110. Moreover, such a tendency is increased due to the fact that the opposite side walls 110*a* of the branch terminal frame 110 are likely to expand or spread sidewise due to spreading action of the lead wires 120*a* of the neutral line 120. Here, it is to be noted that the same problem arises with the main terminal frame 112.

Figure 6:
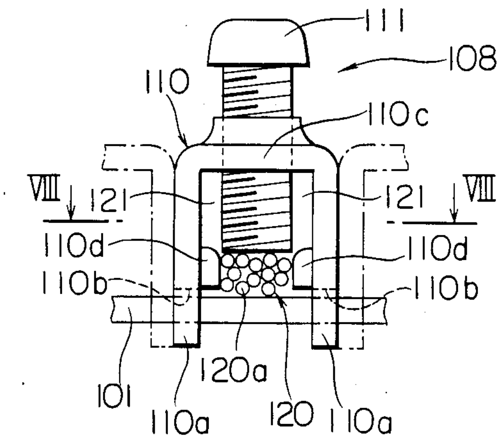
FIG. 6 illustrates a front elevation view of a modified version of the branch terminal of the present invention.
Figure 7:
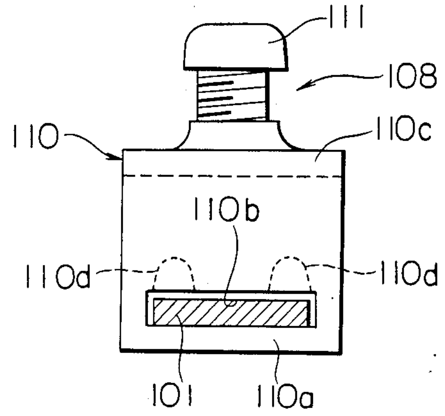
FIG. 7 is a side elevation view of the modified version of the branch terminal of FIG. 6.
Figure 8:
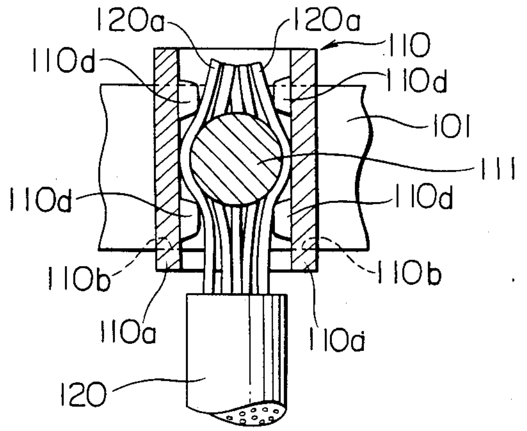
FIG. 8 is a cross-section view taken along line VIII—VIII of FIG. 6.

FIGS. 6 through 8 show a modified form of the branch terminal frame which is intended to cope with the above problem, and which is capable of preventing the escape or spreading of the lead wires 120*a* of the neutral line 120 from the branch terminal frame 110 so as to preclude the disconnection of the neutral line from the branch terminal frame 110.

To this end, as shown in FIGS. 6 through 8, the branch terminal frame 110 has integrally formed at the inner surfaces of the opposite side walls 110*a* thereof two pairs of projections 110*d* which are formed on the upper edge of the respective openings 110*b* in the side walls 110*a* and which project inwardly therefrom in each pair in opposed relation to each other around the shank of the screw 111 threaded into the top wall 110*c* of the branch terminal frame 110.

With the provision of the four projections 110*d*, that part of the lead wires 120*a* of the neutral line 120 disposed between the two pairs of opposed projections 110*d*, which is not clamped against the bus bar 101 by the terminal screw 111, remains in an unclamped state. The remaining portions of the lead wires 120*a* of the neutral line 120 clamped by the terminal screw 111 are forced to spread sidewise so that the thus spread lead wires 120*a* are electrically connected with the branch terminal frame 110 in an outwardly bulged state, as clearly shown in FIG. 8. Accordingly, in this state, it is to be noted that the outwardly bulged portions of the lead wires 120*a*, being held between the adjacent pairs of projections 110*d*, serve to prevent any inadvertent coming off or disconnection of the lead wires 120*a* from the branch terminal frame 110, thus ensuring a reliable and satisfactory electrical connection between the neutral line 120 and the bus bar 101. Also, as shown in FIG. 6, all the lead wires 120*a* are held between the respective pairs of opposed projections 110*d* and clampingly pressed against the bus bar 101 by means of the shank end of the branch terminal screw 111 so that any upward escape of these parts of the lead wires 120*a* is prevented.

In this embodiment, if the distance between the opposed projections 110*d* is set to be smaller than the outside diameter of the terminal screw 111, as pictured in FIG. 8, a part of the lead wires 120*a* is caused to bulged outwardly without fail so as to provide a much more firm connection between the lead wires 120*a* and the terminal frame 110.

In addition, in cases where the clearance 121 between the terminal screw 111 and the projections 110*d* therearound is set to be less than the diameter of each lead wire 120*a* of the neutral line 120, there will be no upward escape of the lead wires 120*a* so that a further firm connection of the neutral line 120 with the branch terminal frame 110 is ensured.

In this connection, it is to be understood that the above description about the modified form of the branch terminal is, of course, applicable to the main terminal.

Further, it will be appreciated to those skilled in the art that although the above description has referred to a terminal assembly for an electrical panel board alone, the same operation and effects will be achieved if it is applied to a terminal assembly for general use.

In the above described embodiment, the support members 102 generally formed by molding of synthetic resin are hygroscopic but do not shrink under prssure when moisture is absorbed. On the other hand, the insulating plate 105 generally formed of fiber is hygroscopic and shrinks, upon absorption of moisture, in the direction of pressure application so that the insulating plate 105 beneath the support members 102 is forced, when wet to shrink in thickness under the action of thrust forces of the fastening screws 104. As a result, a gap or clearance is formed between the insulating plate 105 and the bottom surface 102*c* of each support member 102 which makes the mounting of the support members 102 unstable and shaky.

Figure 9:
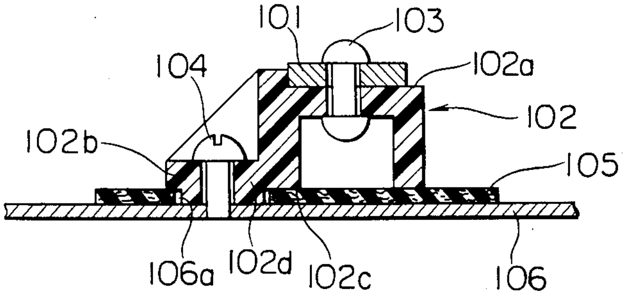
FIG. 9 is a cross sectional view similar to FIG. 2 but showing a modified form of the mounting structure of the terminal assembly.
Figure 10:
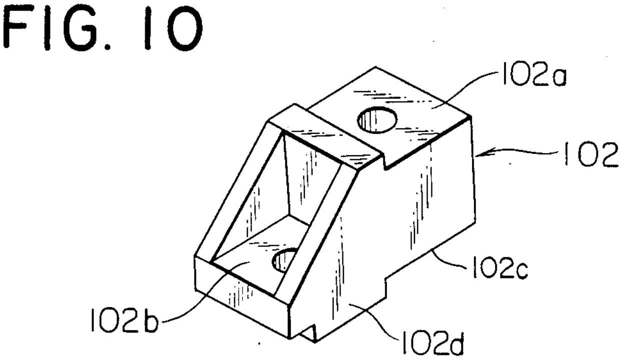
FIG. 10 is a perspective view of a support member shown in FIG. 9.
Figure 11:
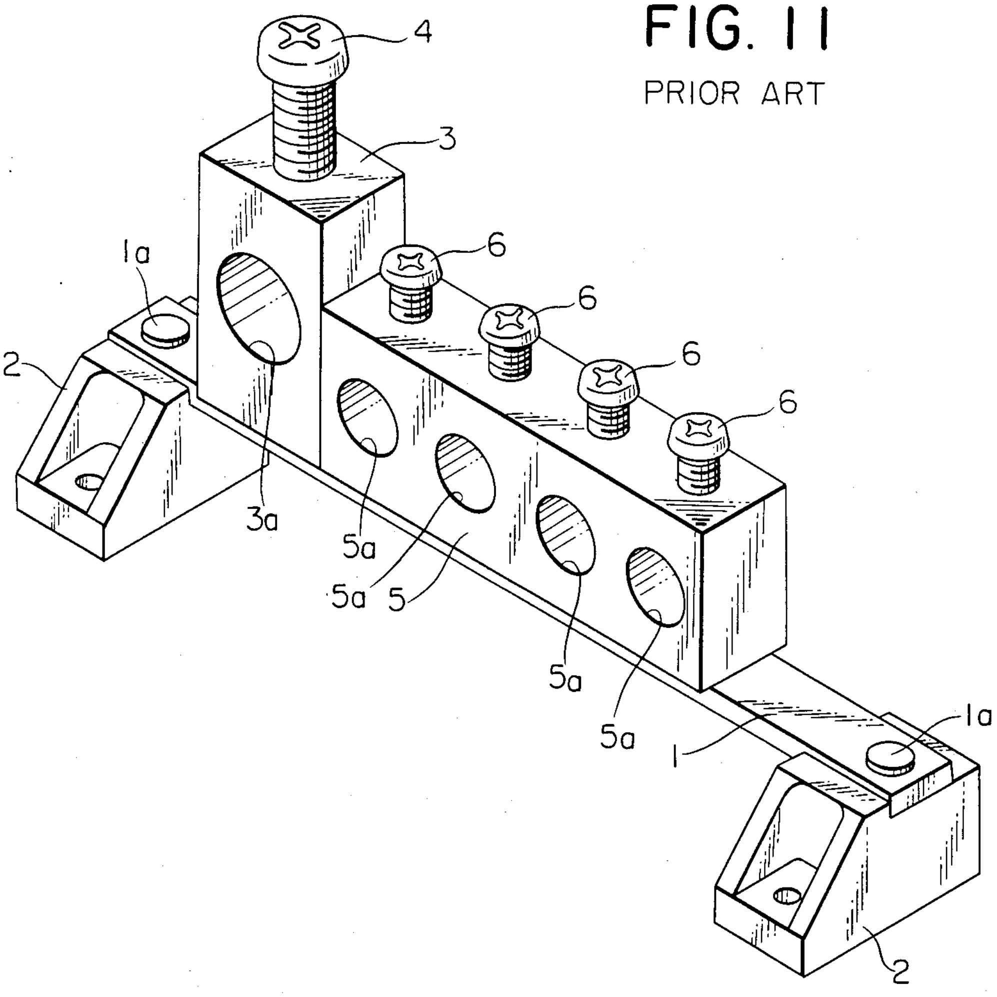
FIG. 11 PRIOR ART
FIG. 11 is a perspective view showing a conventional type of panel board terminal assembly.

FIGS. 9 and 10 show a modified form of the support member which can solve the above problem. To this end, the modified support member 102 has a projected seat 102*d* integrally formed at the bottom surface 102*c* of the mounting portion 102*b* thereof which is adapted to be inserted into a mounting opening 106*a* formed through the insulating plate 105 with its seat end face being place in abutting engagement with the upper surface of the base member 106. In other words, each support member 102 is directly mounted at its projected seat 102*d* on the base member 106. With this construction, when the insulating plate 105 softens and shrinks in thickness under pressure upon absorption of moisture, only a gap between the bottom surface 102*c* of each support member 102 and the upper surface of the insulating plate 105 is formed which, however, does not unstabilize the support members 102. In addition, it is to be noted that the provision of the seat 102*d* does not reduce the electrically insulating effect of the support members 102 since the seat 102*d* is only formed on the bottom surface 102*c* of the mounting portion 102*b*, i.e. on a part of the entire bottom surface of each support member 102.

In the above described modification as illustrated in FIGS. 9 and 10, the seat 102*d* is equal in width to the support member 102 but it is preferable to make the width of the seat 102*d* smaller than that of the support member 102 so that the gap or clearance between the side peripheral surfaces of the projected seat 102*d* and the inner peripheral surfaces of the mounting opening 106*a* in the insulating plate 105 does not extend outwardly from the side surfaces of the respective support member 102, thereby ensuring a much higher electrically insulating effect of the support member.

Although in the illustrated embodiment, the seat 102*d* is shown as a rectangular cross section, it may be of any other cross sectional configuration, and a circular cross section is most preferred from the view point of ease in machining the seat 102*d* on the bottom surface 102*c* of the support member 102 as well as the inherent efficiency in drilling a mounting opening 106*a* in the insulating plate 105.

As described in the foregoing description, the present invention affords the following advantages. Namely, by the use of a plurality of terminal frames each in the form of a U-shaped cross sectional configuration, the entire panel board terminal assembly can be assembled in a very easy and efficient manner merely by inserting a bus bar into the respective terminal frames, thus reducing the material costs in manufacturing.

Further, if the upper surfaces of the opposed side walls of with two pairs of each terminal frame is provided projection extending inwardly therefrom, it is possible to prevent any escape of the lead wires of an external conductor within the terminal frame so as to preclude disconnection of the external conductor from the terminal frame.

In addition, with the provision of a seat projected from the bottom surface of a mounting portion of each support member facing a base member, the support member can be directly attached at its seat to the base member, thereby preventing an unstable or shaky mounting of the support member which would otherwise be caused by shrinkage in the thickness of an insulating plate interposed between the support member and the base member.

What is claimed is:

1. A terminal assembly for a panel board comprising an elongated bus bar having a rectangular cross section and mounted on support members formed of an electrically insulating material, a plurality of terminal frames, each in the form of a substantially U-shaped cross section having a pair of opposed parallel-spaced side walls and an intermediate wall interconnecting the side walls, said walls being of substantially constant thickness, each of the side walls having an aperture formed therein, the apertures in the side walls being rectangularly shaped and sized slightly larger than the cross section of said bus bar, the apertures in the side walls of each terminal frame being aligned for insertion of the bus bar therethrough in a direction perpendicular to said side walls, said terminal frames being mounted on said bus bar with the side walls of adjacent terminal frames parallel to each other and the bus bar inserted through said apertures in a direction perpendicular to said side walls, said terminal assembly further comprising a plurality of terminal screws corresponding in number to the terminal frames, each of said terminal screws having a threaded shank portion which is threaded in the intermediate wall of a corresponding one of said terminal frames for clamping an external conductor inserted between the side walls and between the intermediate wall and said bus bar, an external conductor being clamped between the shank portion of each screw and the bus bar, each of the side walls of each of the terminal frames being formed with a respective pair of projections extending inwardly from one side wall toward an opposed side wall, each projection being disposed near an aperture in the one side wall of which it is formed and being disposed between the aperture and an intermediate wall interconnected to the one side wall, each projection in the one side wall of which it is formed opposing a respective one of the projections formed in the opposed side wall.

2. A terminal assembly for a panel board as set forth in claim 1, wherein each of the terminal frames is formed by pressing a steel plate into a U-shaped cross section.

3. A terminal assembly for a panel board as set forth in claim 1 wherein the distance between the opposing projections formed on the side walls of each terminal frame is less than the diameter of the shank portion of a terminal screw threaded in the intermediate wall of each terminal frame.

4. A terminal assembly for a panel board as set forth in claim 1 wherein the external conductor is comprised of a plurality of lead wires and wherein there is a clearance between the shank portion of each terminal screw and each of the projections of the corresponding one of the terminal frames to which each screw is threaded, and the clearance is less than the diameter of each lead wire of the external conductor.

5. A terminal assembly for a panel board as set forth in claim 1 wherein each of the support members has a mounting portion fixedly attached by fastening means to a base member at a location away from the bus bar with an electrically insulating plate interposed between the base member and the mounting portion, the mounting portion having a seat projecting from its surface facing the base member, the seat being located in a mounting opening formed through the insulating plate so that the support member is directly attached by the fastening means to the base member with an end face of the seat being placed in abutting engagement with the base member.

6. A terminal assembly for a panel board as set forth in claim 5 wherein the seat is of a rectangular cross section.

7. A terminal assembly for a panel board as set forth in claim 5 wherein each seat has a width smaller than the width of the support member from which it projects providing side surfaces disposed inside side surfaces of the support member from which it projects.

8. A terminal assembly for a panel board comprising an elongated bus bar formed of electrically conductive material and having two opposite end portions mounted on respective spaced support members formed of an electrically insulating material, a plurality of terminal frames engaging said bus bar and being mounted on said bus bar between said spaced support members, and at least one terminal screw threaded to each of said terminal frames for securing an electrical connection between an external conductor and said bus bar, wherein each of the support members has a mounting portion fixedly attached by fastening means to a base member at a location away from the bus bar with an electrically insulating plate interposed between the base member and the mounting portion, the mounting portion having a seat projecting from its surface facing the base member, the seat being located in a mounting opening formed through the insulating plate so that the support member is directly attached by the fastening means to the base member with an end face of the seat being placed in abutting engagement with the base member.

9. A terminal assembly for a panel board as claimed in claim 8 wherein the seat is of a rectangular cross section.

10. A terminal assembly for a panel board as claimed in claim 8 wherein each seat has a width smaller than the width of the support member from which it projects providing side surfaces disposed inside side surfaces of the support member from which it projects.

11. A terminal assembly for a panel board comprising an elongated bus bar mounted on support members formed of an electrically insulating material, a plurality of terminal frames, each in the form of a substantially U-shaped cross section, having a pair of opposed side walls and an intermediate wall interconnecting the side walls, the side walls having a pair of aligned openings formed therethrough into which the bus bar is inserted, and a plurality of terminal screws corresponding in number to the terminal frames, each of said terminal screws having a threaded shank portion which is threaded in the intermediate wall of a corresponding one of said terminal frames for clamping an external conductor between the shank portion and the bus bar, wherein each of the support members has a mounting portion fixedly attached by fastening means to a base member at a location away from the bus bar with an electrically insulating plate interposed between the base member and the mounting portion, the mounting portion having a seat projecting from its surface facing the base member, the seat being located in a mounting opening formed through the insulating plate so that the support member is directly attached by the fastening means to the base member with an end face of the seat being placed in abutting engagement with the base member.

12. A terminal assembly for a panel board as claimed in claim 11 wherein the seat is of a rectangular cross section.

13. A terminal assembly for a panel board as claimed in claim 11 wherein each seat has a width smaller than the width of the support member from which it projects providing side surfaces inside side surfaces of the support member from which it projects.

* * * * *